(12) United States Patent
Chowdhury

(10) Patent No.: US 9,279,345 B2
(45) Date of Patent: Mar. 8, 2016

(54) STEAM TURBOMACHINE VALVE HAVING A VALVE MEMBER AND SEAL ASSEMBLY

(71) Applicant: General Electric Company, Schenectady, NY (US)

(72) Inventor: Abhishek Chowdhury, Karnataka (IN)

(73) Assignee: General Electric Company, Schenectady, NY (US)

( * ) Notice: Subject to any disclaimer, the term of this patent is extended or adjusted under 35 U.S.C. 154(b) by 161 days.

(21) Appl. No.: 14/158,006

(22) Filed: Jan. 17, 2014

(65) Prior Publication Data

US 2015/0204215 A1    Jul. 23, 2015

(51) Int. Cl.
*F01K 13/00* (2006.01)
*F01K 7/34* (2006.01)
*F16K 1/42* (2006.01)
*F16K 39/02* (2006.01)
*F16K 41/02* (2006.01)
*F16K 47/08* (2006.01)

(52) U.S. Cl.
CPC . *F01K 7/345* (2013.01); *F16K 1/42* (2013.01); *F16K 39/022* (2013.01); *F16K 39/024* (2013.01); *F16K 41/02* (2013.01); *F16K 47/08* (2013.01)

(58) Field of Classification Search
None
See application file for complete search history.

(56) References Cited

U.S. PATENT DOCUMENTS

| 3,572,633 | A | * | 3/1971 | Gaffney | 251/356 |
| 4,481,776 | A | * | 11/1984 | Araki et al. | 60/660 |
| 6,655,409 | B1 | | 12/2003 | Steenburgh et al. | |
| 7,481,058 | B2 | | 1/2009 | Fukuda et al. | |
| 8,226,362 | B2 | | 7/2012 | Schmitz et al. | |
| 2009/0101859 | A1 | | 4/2009 | Ooishi et al. | |
| 2010/0270491 | A1 | * | 10/2010 | Faas | 251/366 |
| 2010/0301240 | A1 | * | 12/2010 | Bell et al. | 251/118 |
| 2010/0301253 | A1 | * | 12/2010 | Perrault et al. | 251/333 |
| 2011/0012046 | A1 | * | 1/2011 | Bell | 251/359 |
| 2012/0304952 | A1 | * | 12/2012 | Perrin et al. | 123/188.2 |

* cited by examiner

*Primary Examiner* — Jesse Bogue
(74) *Attorney, Agent, or Firm* — Ernest G. Cusick; Frank A. Landgraff

(57) ABSTRACT

A steam turbomachine valve includes a valve body having an inlet portion, an outlet portion, and an interior portion. The interior portion includes an inner wall. A valve member is slidingly disposed within the interior portion of the valve body. The valve member includes an outer surface. A seal element is mounted to, and extends about, the outer surface of the valve member. The seal element is spaced from the inner wall by a gap. A seal assembly is mounted to the inner wall. The seal assembly spans the gap and is configured and disposed to contact the seal element of the valve member.

19 Claims, 4 Drawing Sheets

STEAM TURBOMACHINE VALVE HAVING A VALVE MEMBER AND SEAL ASSEMBLY

BACKGROUND OF THE INVENTION

The subject matter disclosed herein relates to the art of steam turbomachines and, more particularly, to a steam turbomachine valve having a valve member and seal assembly.

Steam turbomachine systems generally include multiple turbine sections each of which extracts work from a flow of steam. The multiple turbine sections may include a high pressure (HP) steam turbine portion, an intermediate pressure (IP) steam turbine portion, and a low pressure (LP) steam turbine portion. One or more valves control the flow of steam passing from one of the turbine sections to others of the turbine sections and, in some cases, to a heat recovery steam generator (HRSG). Each of the one or more valves includes a valve body that supports a valve member. The position of the valve member is selectively controlled to block passage of the steam flow or allow the steam flow to pass. The valve includes a seal between the valve member and the valve body. In most cases, the seal is provided on the valve member and is positioned to prevent the flow of steam from passing through a gap between the valve member and the valve body and to maintain a lower pressure upstream of the valve.

BRIEF DESCRIPTION OF THE INVENTION

According to one aspect of an exemplary embodiment, a steam turbomachine valve includes a valve body having an inlet portion, an outlet portion, and an interior portion. The interior portion includes an inner wall. A valve member is slidingly disposed within the interior portion of the valve body. The valve member includes an outer surface. A seal element is mounted to, and extends about, the outer surface of the valve member. The seal element is spaced from the inner wall by a gap. A seal assembly is mounted to the inner wall. The seal assembly spans the gap and is configured and disposed to contact the seal element of the valve member.

According to another aspect of an exemplary embodiment, a steam turbomachine includes a high pressure (HP) turbine portion, an intermediate pressure (IP) turbine portion operatively connected to the HP turbine portion, a low pressure (LP) turbine portion operatively connected to at least one of the HP turbine portion and the IP turbine portion, and a steam valve fluidically connected to at least one of the HP turbine portion, IP turbine portion, and LP turbine portion. The steam valve includes a valve body having an inlet portion, an outlet portion, and an interior portion. The interior portion includes an inner wall. A valve member is slidingly disposed within the interior portion of the valve body. The valve member includes an outer surface. A seal element is mounted to, and extends about, the outer surface of the valve member. The seal element is spaced from the inner wall by a gap. A seal assembly is mounted to the inner wall. The seal assembly spans the gap and is configured and disposed to contact the seal element of the valve member.

According to yet another aspect of an exemplary embodiment, a steam turbomachine system includes a high pressure (HP) turbine portion, an intermediate pressure (IP) turbine portion operatively connected to the HP turbine portion, a low pressure (LP) turbine portion operatively connected to at least one of the HP turbine portion and the IP turbine portion, one of a heat recovery steam generator (HRSG) and a boiler operatively connected to each of the HP turbine portion, IP turbine portion, and LP turbine portion, and a steam valve fluidically connected to at least one of the HP turbine portion, IP turbine portion, and LP turbine portion. The steam valve includes a valve body having an inlet portion, an outlet portion, and an interior portion. The interior portion includes an inner wall. A valve member is slidingly disposed within the interior portion of the valve body. The valve member includes an outer surface. A seal element is mounted to, and extends about, the outer surface of the valve member. The seal element is spaced from the inner wall by a gap. A seal assembly is mounted to the inner wall. The seal assembly spans the gap and is configured and disposed to contact the seal element of the valve member.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
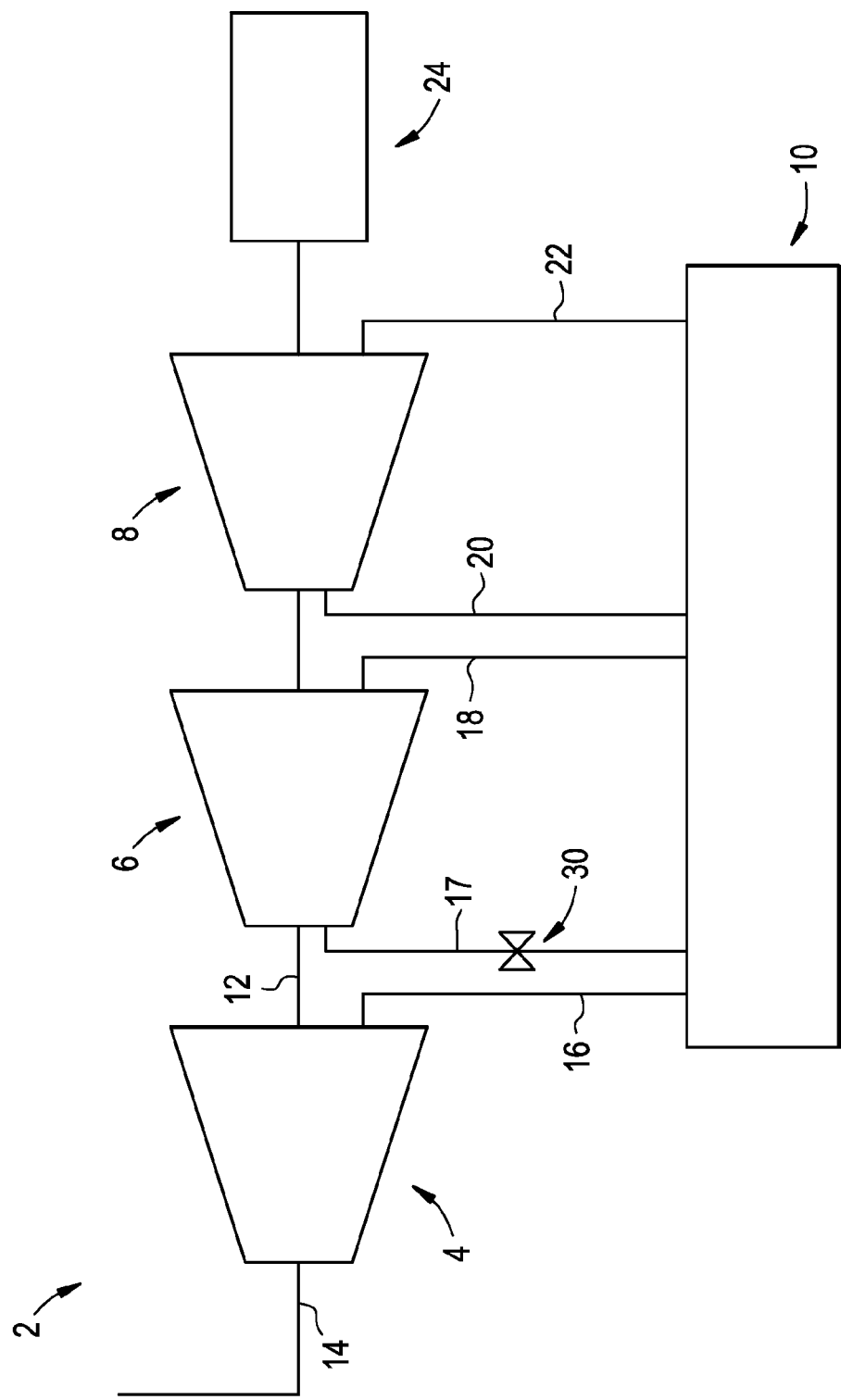
FIG. 1 is a schematic view of a steam turbomachine system including a steam turbomachine fluidically connected to a valve having a valve member and seal assembly, in accordance with an exemplary embodiment.

A steam turbomachine system, in accordance with an exemplary embodiment, is indicated generally at 2, in FIG. 1. Steam turbomachine system 2 includes a high pressure (HP) turbine portion 4 operatively connected to an intermediate pressure (IP) turbine portion 6 and a low pressure (LP) turbine portion 8. HP turbine portion 4, IP turbine portion 6 and LP turbine portion 8 are fluidically connected to a heat recovery steam generator (HRSG) 10. Alternatively, HP turbine portion 4, IP turbine portion 6 and LP turbine portion 8 may be fluidically connected to a boiler. It should be understood that HP turbine portion 4, IP turbine portion 6 and LP turbine portion 8 may also be fluidically connected to a boiler (not shown). At this point it should be understood that while shown as being mechanically linked by a shaft 12, HP turbine portion 4, IP turbine portion 6 and LP turbine portion 8 may also be separate mechanisms. The term "operatively connected" should be understood to include a mechanical and/or a fluidic connection.

HP turbine portion 4 receives steam through a HP turbine inlet 14 and passes steam to a HP portion (not separately labeled) of HRSG 10 through a HP outlet 16. IP turbine portion 6 is fluidically connected to an IP portion (also not separately labeled) of HRSG 10 through an IP inlet 17 and an IP outlet 18. LP turbine portion 8 is fluidically connected to a LP portion (not separately labeled) of HRSG 10 through a LP inlet 20 and a LP outlet 22. LP turbine portion 8 is also shown mechanically linked to a mechanical load 24 such as a generator, a pump or the like.

Figure 2:
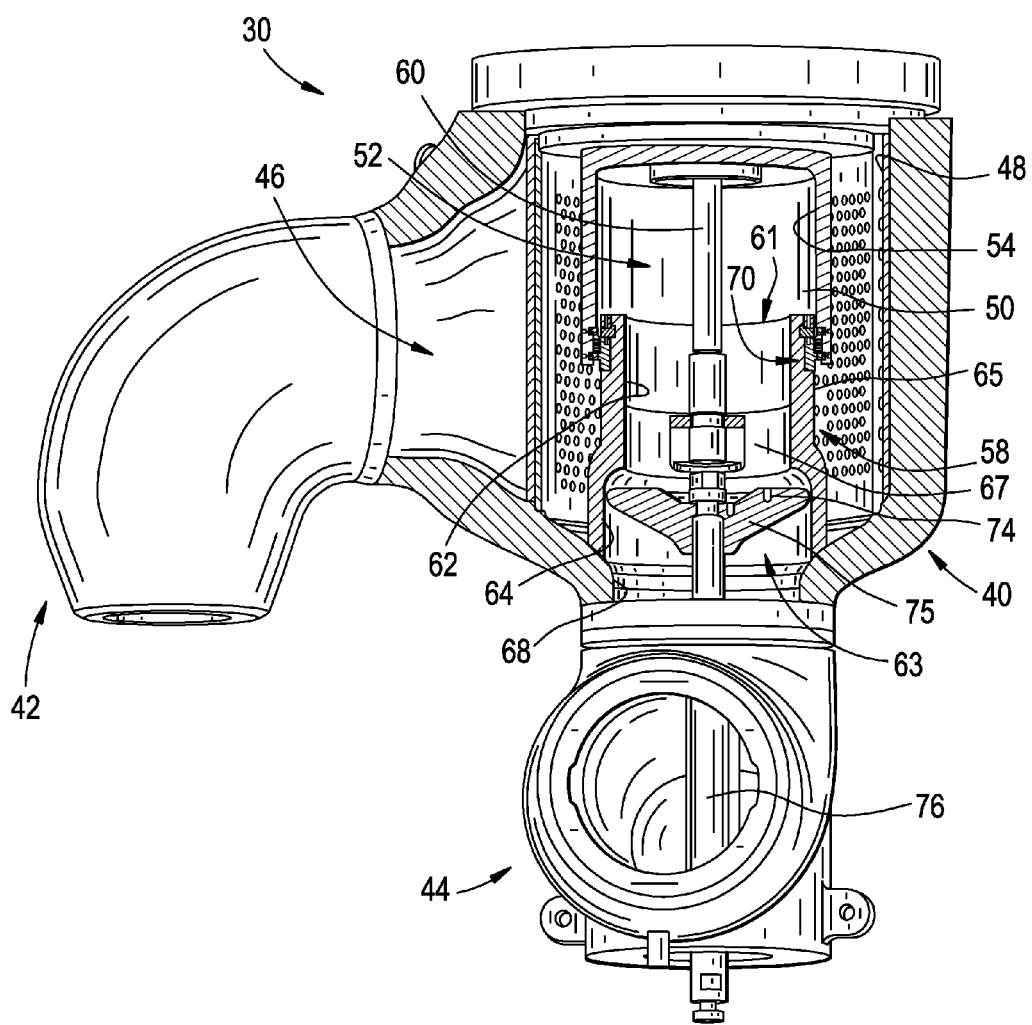
FIG. 2 is a partially cut-away perspective view of the valve including the valve member and seal assembly of FIG. 1.

In accordance with an exemplary embodiment, a steam valve 30 is fluidically connected to IP inlet 17. Of course, it should be understood that additional valves (not shown) may be connected between steam turbomachine system 2 and HRSG 10 and/or a boiler. Also, a valve (not shown) may be provided at HP inlet 14. As shown in FIG. 2, steam valve 30 includes a valve body 40 including an inlet portion 42 fluidically connected to HRSG 10 and an outlet portion 44 fluidically connected to IP turbine portion 6. Valve body 40 also includes a first interior portion 46 having a first inner wall 48 that surrounds a balance chamber 50. Balance chamber 50 may be formed from a high alloy stainless steel having a chromium content of between about 10% and 16% such as Type 410 Stainless Steel, Type 416 Stainless Steel, Cost E, Cost B and/or 12 chrome and includes a second interior portion 52 having a second inner wall 54. A first valve member 58 is shiftably arranged within balance chamber 50. First valve member 58 may take the form of a control valve disk or an intercept valve disk and is operatively connected to a first valve stem 60. First valve stem 60 is connected to an actuator (not shown) which may be arranged on an upper portion (not separately labeled) of steam valve 30.

Figure 3:
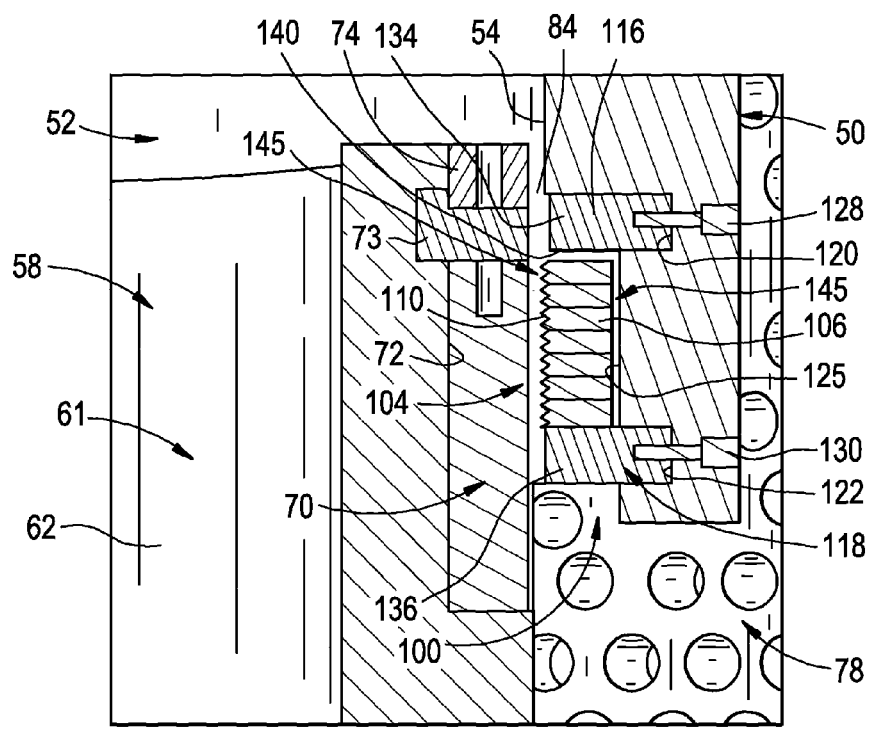
FIG. 3 is a plan view of the seal assembly of FIG. 2.
Figure 4:
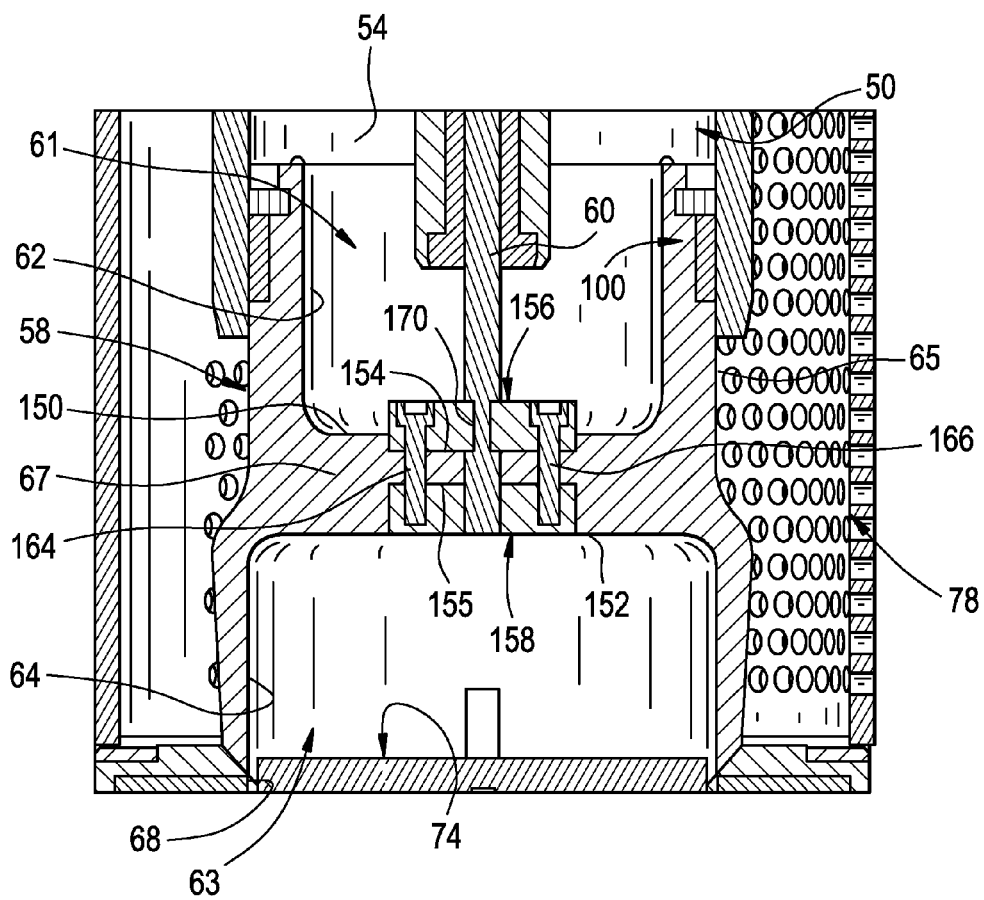
FIG. 4 is a cross-sectional view of the valve member of FIG. 2.

First valve member 58 includes a first portion 61 having a first inner surface section 62, an opposing second portion 63 having a second inner surface section 64 and an outer surface 65. First portion 61 is separated from second portion 63 by a wall 67. Wall 67 is operatively connected to first valve stem 60 in a manner that will be detailed more fully below. First valve member 58 is formed from a high alloy stainless steel having a chromium content of between about 10% and 16% such as Type 410 Stainless Steel, Type 416 Stainless Steel, Cost E, Cost B and/or 12 chrome and is shiftable between a first or closed position and a second or open position. In the closed position, first valve member 58 rests upon a valve seat 68 formed in first interior portion 46 at inlet portion 42. In the open position, steam may freely flow from inlet portion 42 to outlet portion 44. In the exemplary embodiment shown, first valve member 58 includes a seal element 70 mounted to outer surface 65. Seal element 70 is mounted in a recess 72 (FIG. 3) formed in outer surface 65 and extends about first valve member 58. A support element 73 retains seal member 70 in recess 72 and a split ring 74 secures support element 73 to first valve member 58. Seal element 70 is formed from a nickel-chromium based superalloy such as Inco®.

A second valve member 75, shown in the form of a stop valve, is arranged within first valve member 58 at valve seat 68. Second valve member 75 is operatively connected to a second valve stem 76 and selectively closed to stop all steam flow through steam valve 30 in the event first valve member 58 fails to fully close. Steam valve 30 is also shown to include a strainer 78 disposed about balance chamber 50. Steam inside balance chamber 50 is selectively evacuated to achieve a lower pressure differential between upstream valve members 58 and 75 and a downstream outlet portion 44. The evacuation of steam enables first and second valve members 58 and 75 to be shifted into the open position with lower hydraulic forces on respective ones of first and second valve stems 60 and 76. To further facilitate opening and closing of valve 30, a clearance or gap 84 (FIG. 3) exists between outer surface 65 of first valve member 58 and second inner wall 54.

Gap 84 is sized to facilitate operation of first valve member 58 while at the same time limiting steam leakage that might replace the evacuated steam. It is desirable to maintain gap 84 at a predetermined dimension over an operational life of steam valve 30. Accordingly, it is desirable, as will be detailed below, to limit oxidation growth on interfacing components to ensure an uncompromised operation of steam valve 30.

In further accordance with an exemplary embodiment, steam valve 30 includes a nickel-chromium based seal assembly 100 mounted to second inner wall 54. Nickel-Chromium based seal assembly 100 spans gap 84 to limit steam leakage from inlet portion 42 to outlet portion 44. In accordance with an aspect of the exemplary embodiment, nickel-chromium based seal assembly 100 includes a floating seal 104 supported by second inner wall 54. The floating seal 104 reduces steam leakage across first valve member 58. Floating seal 104 may be formed as a plurality of seal members 106 in the form of annular rings. Each seal member 106 is formed from a nickel-chromium based superalloy such as Inco®. At this point it should be understood that while described as being annular, each seal member 106 may have a split to ease installation into second inner wall 54. Alternatively, each seal member 106 may be formed from one or more seal sections. Also, it should be understood that seal assembly 100 may include a single piece annular ring that may or may not include a split to facilitate mounting. Further, each seal member 106 includes a plurality of corrugations 110 that provide an interface with seal element 70.

In the exemplary embodiment shown, seal members 106 are arranged between a first seal support 116 and a second seal support 118. First seal support 116 is constrained within a first recess 120 formed in second inner wall 54. Likewise, second seal support 118 is constrained within a second recess 122 formed in second inner wall 54. Seal members 106 are arranged within a third recess 125 arranged between first and second seal supports 116 and 118. Constraining first and second seal supports 116 and 118 within recesses 120 and 122 reduces clearance problems associated with oxidation growth. That is, oxidation growth, which may occur during operation, has little effect on clearances between first and second seal supports 120 and 122 and seal members 106.

First seal support 116 is secured to second inner wall 54 by a first plurality of mechanical fasteners 128. Similarly, second seal support 118 is secured to second inner wall 54 by a second plurality of mechanical fasteners 130. First and second seal supports 116 and 118 take the form of first and second split rings 134 and 136. A gap 140 exists between first split ring 134 and seal members 106. Gap 140 accommodates thermal and/or oxidation growth effects. In addition, a gap 145 may exist between seal assembly 100 and balance chamber 50. Gap 145 may accommodate expansion of seal assembly 100 within recess 125. In accordance with an aspect of the exemplary embodiment, first and second split rings 134 and 136 are formed from a nickel-chromium based superalloy such as Inco®. The use of nickel-chromium based superalloys enables seal assembly 100 to accommodate thermal expansions of balance chamber 50 and first valve member 58. Further, by mounting seal assembly 100 on second inner wall 54, balance chamber 50 may be formed from a high alloy stainless steel including a chromium content of between about 10% and 16% such as Type 410 Stainless Steel, Type 416 Stainless Steel, Cost E, Cost B and/or 12 chrome. Forming balance chamber 50 from a material other than the nickel-based superalloy will greatly reduce production and maintenance costs of steam valve 30. It should be understood that nickel-chromium based seal assembly 100 may also take the form of a non-floating seal, and/or a seal formed from a single seal member.

It should also be understood that the use of the nickel-chromium based superalloy to form seal element 70 and seal assembly 100 enables steam valve 30 to accommodate higher temperature steam flows. Specifically, nickel-chromium based superalloy to nickel-chromium based superalloy contact between seal assembly 100 and first valve member 58 promotes a reduced oxidation growth between seal element 70 and floating seal 104 so that clearances between outer surface 65 and second inner wall 54 remain substantially stable at all operational temperatures and pressures and further enables steam valve 30 to accommodate steam temperatures of 1150° F. (621.1° C.) or more. Moreover, mounting a nickel-chromium based superalloy seal element 70 to outer surface 65 allows first valve member 58 to be formed from a high alloy stainless steel including a chromium content of between about 10% and 16% while still accommodating the higher temperature steam flows. The use of a high alloy stainless steel including a chromium content of between about 10% and 16% to form first valve member 58 leads to a significant cost and cycle time reduction of steam valve 30 as compared to forming valve 30 entirely from a nickel-chromium based superalloy or Inoco® based material.

In further accordance with the exemplary embodiment, wall 67 dividing first portion 61 and second portion 63 of first valve member 58 includes a first surface 150 and an opposing, second surface 152. First surface 150 includes a first recessed portion 154 and second surface 152 includes a second recessed portion 155. Wall 67 includes a first strengthening member 156 mounted to first surface 150 at first recessed portion 154. Wall 67 also includes a second strengthening member 158 mounted to second surface 152 at second recessed portion 155. In accordance with an aspect of the exemplary embodiment, each strengthening member 156 and 158 is formed from a nickel-chromium based superalloy such as Inco®. A plurality of mechanical fasteners, two of which are shown at 164 and 166, join strengthening member 156 to second strengthening member 158 through wall 67. In further accordance with the exemplary embodiment, first valve stem 60 includes a recessed section 170 that receives first strengthening member 156. With this arrangement first and second strengthening members 156 and 158 provide support to wall 67 so that first valve member 58 may be formed from a high alloy stainless steel including a chromium content of between about 10% and 16% such as Type 410 Stainless Steel, Type 416 Stainless Steel, Cost E, Cost B and/or 12 chrome.

Forming strengthening members 156 and 158 from a nickel-chromium based superalloy such as Inco® allows valve 30 to operate at higher temperatures above, for example 1150° F. (621° C.). Further, forming strengthening members 156 and 158 from a nickel-chromium based superalloy such as Inoco® allows mechanical fasteners 166 to withstand higher sheer stresses during opening of first valve member 58 against full steam pressure. Also, the use of a nickel-chromium based superalloy such as Inoco® to form first strengthening member 156 provides a material and, by extension, a coefficient of thermal expansion match with strengthening member 158 to reduce bending stresses on fasteners 164 and 166.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A steam turbomachine valve comprising:
    a valve body including an inlet portion, an outlet portion, and an interior portion, the interior portion including an inner wall;
    a valve member slidingly disposed within the interior portion of the valve body, the valve member including an outer surface;
    a seal element mounted to and extending about, the outer surface of the valve member, the seal element being spaced from the inner wall by a gap; and
    a seal assembly mounted to the inner wall, the seal assembly spanning the gap and being configured and disposed to contact the seal element of the valve member, wherein the seal assembly comprises a floating seal, a first seal support, and a second seal support, the floating seal being arranged between the first and second seal supports and each of the first and second seal supports extend into, and are constrained by, the inner wall.

2. The steam turbomachine valve according to claim 1., wherein the seal assembly comprises a floating seal having a plurality of seal members.

3. The steam turbomachine valve according to claim 1, wherein the seal assembly is formed from a nickel-chromium based superalloy.

4. The steam turbomachine valve according to claim 3, wherein the valve member is formed from a high alloy stainless steel including a chromium content of between 10% and 16% and the seal element is formed from a nickel-chromium based superalloy.

5. A steam turbomachine comprising:
    a high pressure (HP) turbine portion;
    an intermediate pressure (IP) turbine portion operatively connected to the HP turbine portion;
    a low pressure (LP) turbine portion operatively connected to at least one of the HP turbine portion and the IP turbine portion; and
    a steam turbomachine valve according to claim 1 fluidically connected to at least one of the HP turbine portion, IP turbine portion, and LP turbine portion.

6. The steam turbomachine according to claim 5, wherein the floating seal comprises a plurality of seal members.

7. The steam turbomachine according to claim 5, wherein the valve member is formed from a high alloy stainless steel including a chromium content of between 10% and 16% and each of the seal element and plurality of seal members is formed from a nickel-chromium based superalloy.

8. The steam turbomachine according to claim 5, further comprising:
    one of a heat recovery steam generator (HRSG) and a boiler operatively connected to each of the HP turbine portion, IP turbine portion, and LP turbine portion.

9. The steam turbomachine according to claim 8, wherein the valve member is formed from a high alloy stainless steel including a chromium content of between 10% and 16% and includes a first interior portion separated from a second interior portion through a all having a first surface and an opposing second surf lice, at least one nickel-chromium based superalloy strengthening member mounted to one of the first and second surfaces of the wall, and a valve stem is operatively connected to the at least one nickel-chromium based superalloy strengthening member.

10. A steam turbomachine valve comprising:
    a valve body including an inlet portion, an outlet portion, and an interior portion, the interior portion including an inner wall;

a valve member slidingly disposed within the interior portion of the valve body, the valve member including an outer surface;

a seal element mounted to, and extending about, the outer surface of the valve member, the seal element being spaced from the inner wall by a gap; and a seal assembly mounted to the inner wall, the seal assembly spanning the gap and being configured and disposed to contact the seal element of the valve member, wherein the valve member surface and an opposing second surface and further comprising at least one strengthening member mounted to one of the first and second surfaces of the wall, wherein the at least one strengthening member includes a first strengthening member mounted to the first surface of the wall and a second strengthening member mounted to the second surface of the wall, each of the first and second strengthening members being formed from a nickel-chromium based superalloy.

11. The steam turbomachine valve according to claim 10, further comprising: a valve stem operatively connected to the valve member through the at least one strengthening member.

12. The steam turbomachine valve according to claim 10, wherein the seal assembly comprises a floating seal having a plurality of seal members.

13. The steam turbomachine valve according to claim 10, wherein the seal assembly is formed from a nickel-chromium based superalloy.

14. The steam turbomachine valve according to claim 13, wherein the valve member is formed from a high alloy stainless steel including a chromium content of between 10% and 16% and the seal element is formed from a nickel-chromium based superalloy.

15. A steam turbomachine comprising:
a high pressure (HP) turbine portion;
an intermediate pressure (IP) turbine portion operatively connected to the HP turbine portion;
a low pressure (LP) turbine portion operatively connected to at least one of the HP turbine portion and the IP turbine portion; and a steam turbomachine valve according to claim 10 fluidically connected to at least one of the HP turbine portion, IP turbine portion, and LP turbine portion.

16. A steam turbomachine comprising:
a high pressure (HP) turbine portion;
an intermediate pressure UP) turbine portion operatively connected to the HP turbine portion;
a low pressure (LP) turbine portion operatively connected to at least one of the HP turbine portion and the IP turbine portion; and
a steam turbomachine valve according to claim 12 fluidically connected to at least one of the HP turbine portion, IP turbine portion, and LP turbine portion.

17. A steam turbomachine comprising:
a high pressure (HP) turbine portion;
an intermediate pressure (IP) turbine portion operatively connected to the HP turbine portion;
a low pressure (LP) turbine portion operatively connected to at least one of the HP turbine portion and the IP turbine portion; and
a steam turbomachine valve according to claim 13 fluidically connected to at least one of the HP turbine portion, IP turbine portion, and LP turbine portion.

18. A steam turbomachine comprising:
a high pressure (HP) turbine portion;
an intermediate pressure (IP) turbine portion operatively connected to the HP turbine portion;
a low pressure (LP) turbine portion operatively connected to at least one of the HP turbine portion and the IP turbine portion; and
steam turbomachine valve according to claim 14 fluidically connected to at least one of the HP turbine portion, IP turbine portion, and LP turbine portion.

19. The steam turbomachine according to claim 15, further comprising:
one of a heat recovery steam generator (HRSG) and a boiler operatively connected to each of the HP turbine portion, IP turbine portion, and LP turbine portion.

* * * * *